April 26, 1927.
E. G. K. ANDERSON
1,626,376
REWINDING REEL
Filed Aug. 14, 1919
2 Sheets-Sheet 1
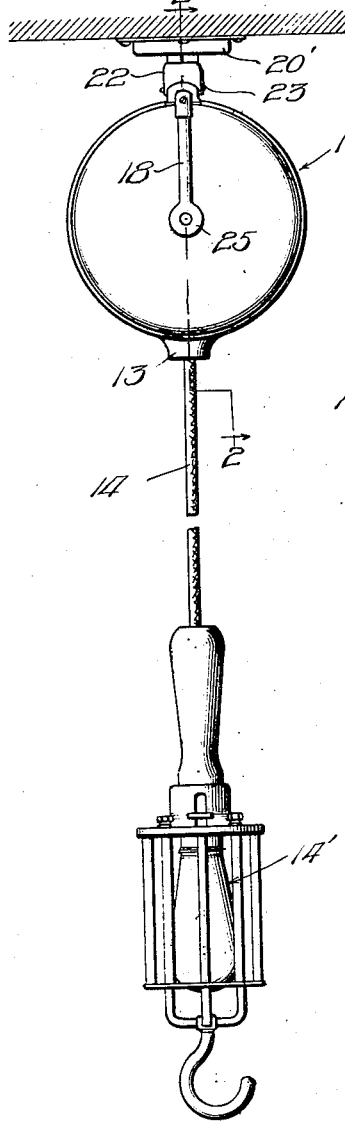
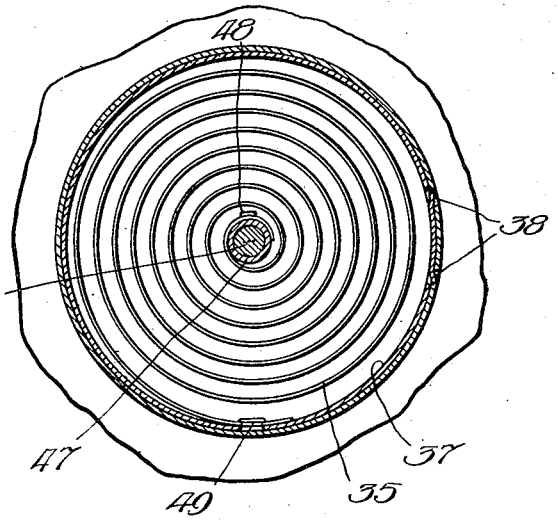
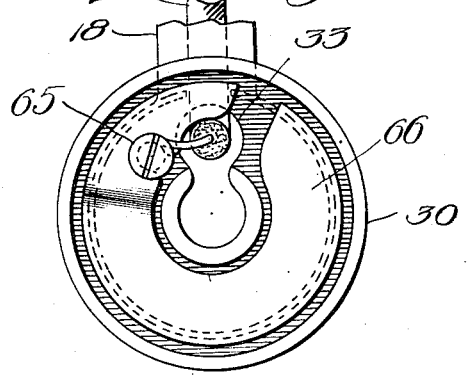
Witness
Harry J. Gaither
Inventor:
Ernst G. K. Anderson
by William L. Hall
Atty April 26, 1927.
E. G. K. ANDERSON
1,626,376
REWINDING REEL
Filed Aug. 14, 1919
2 Sheets-Sheet 2
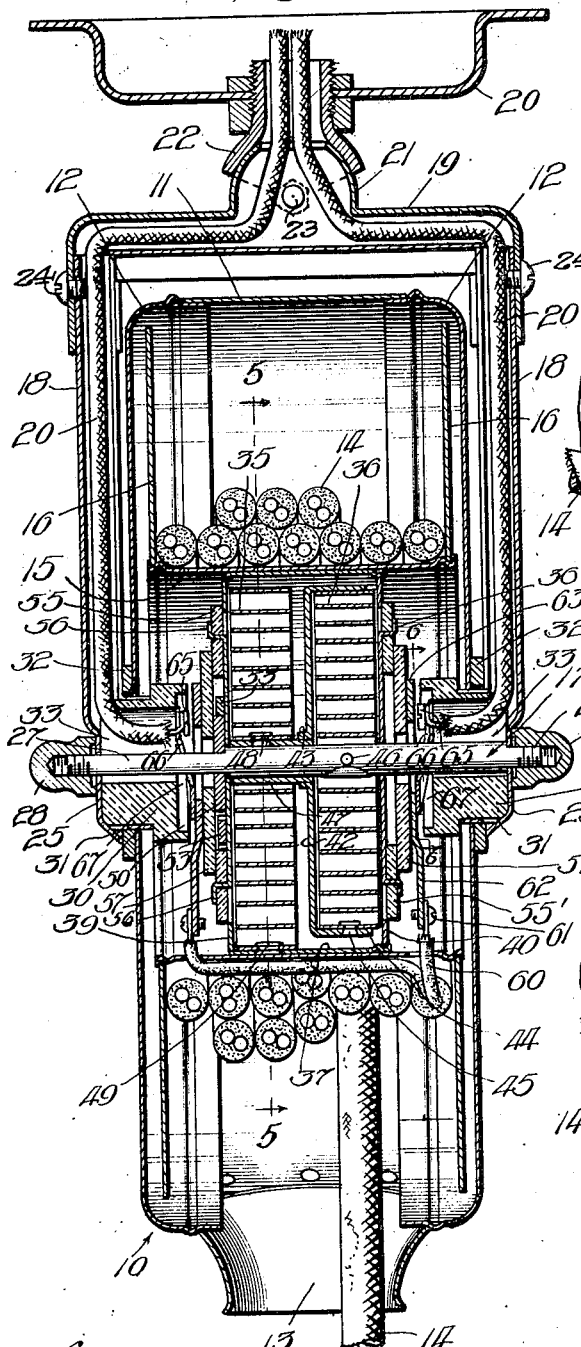
Witness
Harry S. Gaither
Inventor
Ernst G. K. Anderson
by William W. Hall
Atty Patented Apr. 26, 1927.

1,626,376

UNITED STATES PATENT OFFICE.

ERNST G. K. ANDERSON, OF CHICAGO, ILLINOIS, ASSIGNOR, BY MESNE ASSIGNMENTS, TO APPLETON ELECTRIC CO., OF CHICAGO, ILLINOIS, A CORPORATION OF ILLINOIS.

REWINDING REEL.

Application filed August 14, 1919. Serial No. 317,399.

This invention relates to improvements in rewinding reel structures adapted particularly for use in connection with extension fixtures, such as lamps and the like, to receive the conductor cord of the fixture circuit and to permit said cord to be pulled outwardly away from the structure to bring the fixture to any position within the range of the cord and to automatically rewind the cord on the reel.

The present invention relates more particularly to improvements in rewinding reel structures of this character adapted for heavy duty in such places as garages, machine shops, and the like, where it is necessary to provide reel capacity to receive a relatively long conductor cord of substantial diameter, and also to provide an improved rewinding reel where the rewinding springs are so arranged as to effect a substantially uniform rewinding tension on the cord regardless of the distance the fixture is withdrawn from the reel structure.

Other objects of the invention are to improve and simplify reel structures for the purpose set forth, and the invention consists in the combination and arrangement of the parts shown in the drawings and described in the specification, and is pointed out in the appended claims.

In the drawings,

Figure 1 is a side elevation of a rewinding reel, its cord, and a lamp connected thereto, embodying my invention.

Figure 2 is an enlarged axial section of the reel structure on the line 2—2 of Figure 1.

Figure 3 is an end view of the reel spool, with parts removed, showing the contact elements between the external circuit conductors and the conductors of the cord.

Figure 4 is a detail, with parts removed, illustrating the reel locking dogs.

Figure 5 is a section on the line 5—5 of Figure 2.

Figure 6 is a detail section as seen from the position indicated by the line 6—6 of Figure 2.

As shown in the drawings, 10 designates as a whole the casing which encloses and supports the reel structure. Said casing, as shown, comprises an intermediate ring member 11 and two end members 12, 12 which are shown as telescopically engaged with the intermediate member. The intermediate member is formed at the lower side of the casing (or it may be at the lateral side) to provide an outlet 13 for the conductor cord 14 which is adapted to be wound on the reel spool in the manner hereinafter described.

15 designates a spool which is contained within the casing and on which the cord 14 is wound, to one end of which is connected a lamp fixture 14'. Said spool is provided with cord limiting flanges 16 formed by discs that are provided at their centers with enlarged openings and are fitted over and interlocked to the ends of the spool 15 in a manner to leave the spool ends open for convenient assembling and removal of the parts carried within the spool. 17 designates a non-rotative shaft that is disposed axially of the spool. 18, 18 designate reel supporting arms of a bracket 19 that is sustained, as herein shown, on a ceiling canopy 20'. Said bracket and its arms are hollow to receive conductors 20, 20 of the external circuit and are adapted to be electrically connected to the conductors of the lamp cord in a manner hereinafter described. The transverse portion of the bracket is formed with a central spherical projection 21 which extends upwardly into and fits within a like depending member 22 that depends from the canopy 20' to constitute a hinge suspension for the casing. Said members 21 and 22 are secured together by a pin 23 shown in Figure 2, and said hinge connection and another formed by the screws 24 that connect the bracket 19 and arms 18 afford a universally swinging suspension for the casing. Said swivel members are hollow for the passage of the conductor cords 20, the cords branching in opposite directions for passage through the reel supporting arms 18.

Said hollow reel supporting arms 18 lie along the sides of the enclosing casing 10 and are formed at their lower ends to provide heads 25 through which the shaft 17 extends. The shaft is flattened at its ends at 26, 27 which extend through said heads 25 so that thereby the shaft is held non-rotative with respect to said supporting arms. The flattened ends of said shafts are threaded to receive nuts 28 which bear against the supporting arm heads to confine the reel structure elements in place; the structure being such that when the nuts are removed the structure may be laterally separated for the purpose of dismantling the same.

30, 30 designate insulators that surround the shaft laterally inside the heads 25. They are reduced in diameter to extend through the end members 12 of the casing and are held fixedly in place with respect to the casing and to the supporting arms 18 by means of spurs 31 that are struck inwardly from the lower portions of the heads 25 to fit against said insulators. The outer ends of the insulators fit flat against the end walls of the heads 25 and the nuts 28 bear against the outer faces of said heads. Spacing washers 32 are interposed between the end walls of the casing members 12 and said spurs 31 of heads 25 of the supporting arms and serve to transmit the stress of the nuts to the casing members 12. The said insulators are formed at the sides of the shaft openings therein with other openings 33 to receive the lower inturned ends of the conductors 20.

35, 36 designate spiral rewinding springs that are arranged side by side within the spool 15 around the shaft 17. The said springs are contained within a barrel 37 that fits closely in the spool and is interlocked thereto in any suitable manner, as by the spurs 38 on the barrel that interlocks in openings in the spool 15, as shown in Figure 5. The barrel 37 is composed principally of a cup member comprising a cylindric shell and an integral end member 39, and said cup member is closed at its end remote from the end member 39 by a spring retaining disc 40 that fits within the open end of the cup member, which latter is spun at its open edge over the edge of the retaining disc.

42 designates a second cup-shaped barrel within the spool 37. It is edgewise disposed to the barrel 37 and has a central hub 43 concentric to the shaft 17, and said barrel 42 includes a peripheral, cylindric flange 44, completing the cup, in which the spring 36 is contained. The outer end of the spring 36 is attached by a rivet 45 to the cylindric flange 44 and the inner end of said spring is fixed by a pin 46 to the shaft 17. Fixed to or made integral with the barrel for the spring 36 is a sleeve 47 that loosely surrounds and has bearing on the shaft 17 just inside its flattened portion 27, and to this sleeve is attached, as by means of a lug 48, the inner end of the spring 35. The outer end of said spring 35 is attached by means of a rivet 49 to the spring barrel 37.

Fitted over the flattened portion 27 of the shaft 17 exterior to the barrel 37 is a collar 50 that is interlocked to the shaft so as to be non-rotative thereon. Said collar is provided with diametrically opposed recesses 51 (Figure 4) that are engaged by the teeth 52 of dogs 53, which latter are pivoted at their ends to lugs 54 that are struck outwardly from and are integral with the end wall 39 of the adjacent spring barrel; said dogs and the recessed collar acting in a known manner to lock the reel from rewinding but permitting it to rotate under the action of its springs 35, 36 by a slight pull of the cord to automatically rewind the cord on the reel.

The said dogs and the collar 50 are enclosed in a space at the end of the barrel formed in an opening in an insulating washer 55 that is fixedly attached to the end wall of the barrel by means of spurs 56 struck outwardly therefrom in the manner shown in Figures 2, 3, and 4, and a second, centrally apertured disc or washer 57 that overlies the disc 55 and may be attached thereto by the rivets 58, as shown in Figure 3. At the other end of the barrel similar insulating discs and washers 55' and 57' are provided, which render the reel structure symmetrical in this respect, and also provide means whereby the locking dogs and collar may be employed at either side of the reel; the shaft being endwise reversed in this latter arrangement.

Current is conducted to the conductors 60 of the cord 14 from the conductors 20 of the external circuit through contacts which are made as follows:

The said conductors 60 extend laterally from the cord 14 and are threaded through openings in the spool 15 in the manner shown in Figures 2 and 3, each conductor being threaded through two adjacent openings to afford a pinching effect of the spool wall on the conductors to thereby anchor the conductors to the barrels. The bared ends of the conductors 60 are attached by means of binding screws 61 to arms 62 which are made integral with or electrically connected to contact discs 63 that are centrally apertured for the passage of the shaft 17 and are out of contact therewith. The said contact discs 63 may be fixed to the insulating discs or washers 57, 57' by means of lugs 64. The bared ends of the conductors 20 are attached by binding screws 65 to split wiper elements 66 that are located in recesses 67 at the inner ends of the insulators 30. Said wiper elements are curved inwardly for a portion of their length towards the contact discs 63, as shown in Figure 2, so as to bear against the latter discs with a spring pressure and thus maintain good electrical contact between the stationary contact discs and the wiper elements at all times.

In operation, pull on the cord 14 rotates the cord spool against the action of the rewinding springs, in which latter energy is stored to rewind the cord. The said springs 35, 36 attached at their inner ends, one to the sleeve 47 and the other to the fixed shaft 17, are connected in series relative to each other so that the total range of the cord movement when withdrawn from the reel equals the sum of the ranges due to the two springs, and the rewinding tension of the springs is substantially uniform throughout the range of the cord. The two springs, therefore, can occupy less radial space than a single spring of equal rewinding range. The dogs 53 serve to lock the spool when a required length of cord has been unreeled, and the cord may be automatically rewound on the spool by sharply jerking the cord to release the dogs from the recessed collar 50 in a manner well known. The universal connection of the reel hanger with the canopy support allows sufficient movement of the casing to permit it to swing on the support to freely direct the cord therefrom in all directions.

I claim as my invention:

1. A rewinding reel, comprising an open ended cylinder constituting a spool, annular disks surrounding and exteriorly fixed to the ends of said spool and forming flanges therefor in a manner to leave the spool open at its ends, spring barrels disposed within said spool, and a fixed shaft extending through said spool and barrels, the ends of the spool overhanging said barrels.

2. A rewinding cord reel structure for extensible fixtures, comprising an overhead support, a casing provided with a winding spool, and a hollow bracket provided with tubular supporting arms extending alongside the casing and having a universal swivel connection with said overhead support.

3. A rewinding cord reel structure comprising a casing provided with a conductor cord outlet, a hollow hanger provided at opposite sides of the casing with tubular depending spool supporting arms for the passage of conductors of an external circuit and formed at their lower ends with heads, a shaft extending through the spool and casing walls and non-rotatively supported in said heads, a spool within the casing and rotative about said shaft, a spring barrel within said spool, and a rewinding spring in said barrel connected at one end to said barrel and at its other end to said shaft.

4. A rewinding cord reel structure comprising a casing provided with a conductor cord outlet, a hollow hanger provided with depending supporting arms adapted for the passage of conductors of an external circuit and formed at their lower ends with heads, insulators extending through openings in opposite walls of the casing and interlocked to said heads, a shaft extending through said casing and said insulators and non-rotatively fixed to and supported by said heads, a spool within the casing and rotative about said shaft, a spring barrel within said spool, a rewinding spring in said barrel connected at one end to said barrel and at its other end to said shaft, and wiping fixed and rotative contact elements carried by said spool and said insulators, respectively, through which said external circuit conductors and conductors of a cord wound on said spool are adapted to be electrically connected.

5. A rewinding cord reel structure comprising a casing provided with a cord outlet, a spool within said casing, a spring barrel within and fixed to the spool, a supporting hanger provided with depending arms exterior to the casing, a shaft extending through the casing and non-rotatively interlocked at its ends to said arms, and cooperating with means to clamp said arms against the casing walls, said barrel rotating about said shaft, and a rewinding spring within said barrel and operatively connected to said shaft and to said barrel.

6. A rewinding cord reel structure comprising a casing provided with a cord outlet, a spool within said casing, sidewise disposed spring barrels within the spool, one fixed to and the other free from said spool, a supporting hanger provided with depending arms lying at their lower ends exterior to opposing walls of the casing, a shaft about which said spool rotates and extending through the casing walls and said arms and interlocked at its ends to said arms, nuts threaded to the ends of said shaft to clamp said arms on the casing walls, and rewinding springs in said barrels, one connecting said shaft to one barrel and the other connecting said barrels.

7. In a cord rewinding reel structure, a rotative spool open at its ends, apertured cord retaining flanges fitted over the spool at its ends and interlocked thereto, a non-rotative shaft axially disposed in the spool, and a rewinding spring within the spool operatively connected to said shaft and said spool.

8. A rewinding reel structure comprising a casing consisting of a central ring and two end members telescopically and detachably fitted on the ends of said central ring, a rotative spool within said casing comprising an open ended cylinder and flanges fixed to the ends thereof in a way to leave the ends of said spool open, a shaft nonrotatively fixed to the casing and lying in the axis of said spool, and a rewinding spring connected to said shaft and said spool.

In testimony whereof I claim the foregoing as my invention, I hereunto append my signature at Chicago, Illinois, this 12th day of August, 1919.

ERNST G. K. ANDERSON.